Figure 1:
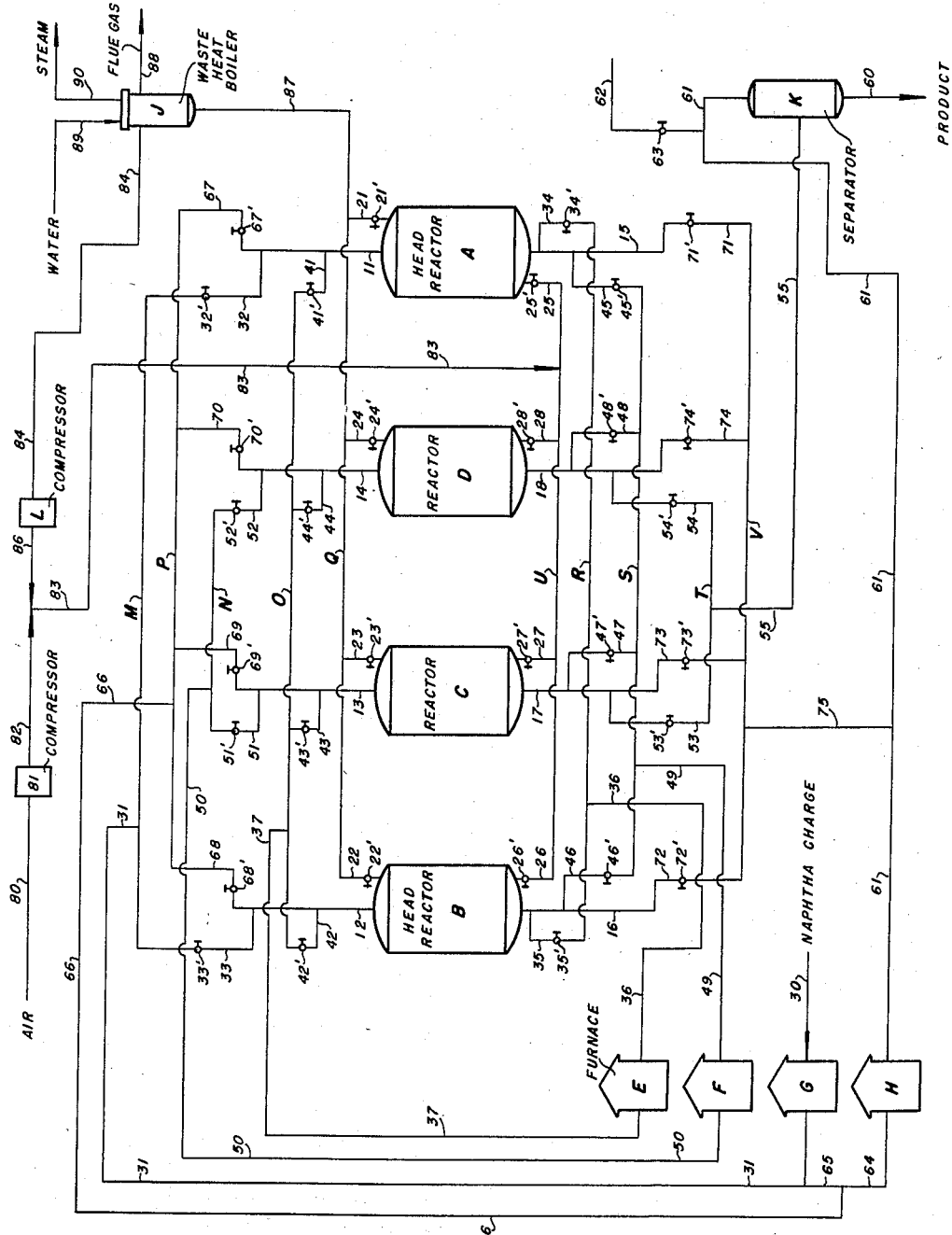

Dec. 30, 1958

W. E. ASKEY ET AL 2,866,744

METHOD OF REFORMING HYDROCARBONS USED
IN PLATINUM CATALYST IN A PLURALITY
OF SEPARATE REACTION ZONES

Filed May 12, 1954

2 Sheets-Sheet 1

INVENTORS.
Warren E. Askey,
BY Robert M. Love.

ATTORNEY.

Dec. 30, 1958  W. E. ASKEY ET AL  2,866,744
METHOD OF REFORMING HYDROCARBONS USED
IN PLATINUM CATALYST IN A PLURALITY
OF SEPARATE REACTION ZONES

Filed May 12, 1954  2 Sheets-Sheet 2

INVENTORS.
Warren E. Askey,
BY Robert M. Love,

ATTORNEY.

United States Patent Office 2,866,744
Patented Dec. 30, 1958

2,866,744

METHOD OF REFORMING HYDROCARBONS USED IN PLATINUM CATALYST IN A PLURALITY OF SEPARATE REACTION ZONES

Warren E. Askey and Robert M. Love, Baytown, Tex., assignors, by mesne assignments, to Esso Research and Engineering Company, Elizabeth, N. J., a corporation of Delaware Application May 12, 1954, Serial No. 429,205

2 Claims. (Cl. 208—65)

This application is directed to the reforming of hydrocarbons in the presence of hydrogen in a system having a plurality of separate reaction zones each containing platinum catalyst and particularly to the procedure for regenerating the platinum catalyst in the several reaction zones.

The catalytic reforming of hydrocarbon feed stock in the presence of platinum catalyst is well known to the art. In this procedure hydrocarbon feed stock in a vaporous state in admixture with hydrogen is contacted with platinum catalyst in a reaction zone to cause reforming of at least a portion of the hydrocarbon feed stock. After the platinum catalyst has been in use for some time, carbon and carbonaceous material accumulate thereon so that it loses its activity for converting hydrocarbons. In accordance with the present invention a system consisting of a plurality of independent reaction zones each containing platinum catalyst is operated in such a way that the bodies of platinum catalyst in the several reactors have their catalyst life decreased in substantially the same amount so that the several bodies of catalyst in the system require reactivation at the same time.

In accordance with the present invention a system having a multiplicity of reactors greater than two has two of the reactors selected as the head reaction zones. Feed mixture consists of vaporized hydrocarbon and hydrogen. The feed mixture is caused to flow in series through all the reaction zones of the system with the exception of one of the reactors. The flow is through a selected head reactor and then in series through the remaining reactors except one which is off stream, including the time during which it is being regenerated.

This flow continues until the body of catalyst in the head reactor onstream has such an amount of carbonaceous materials deposited thereon that it is at least partially deactivated and requires regeneration at which time this head reactor is taken off stream and regenerated while the reaction continues by passing the feed mixture through the other head reactor and then in series through the remaining reactors. The bodies of catalyst in the remaining reactors which are never used as head reactors have carbonaceous material deposited on them at a rate approximately one-half as great as the rate at which such material is deposited in the head reactors and are regenerated by separately taking them off stream while simultaneously flowing the reaction mixture through one of the head reactors and then in series through the remaining reactors except the one being regenerated.

The catalytic reforming of a hydrocarbon feed stock particularly naphthenic hydrocarbons is known to the art. Such naphthenic hydrocarbons usually boil in the range from about 150° to 500° F. and may be obtained from crude petroleums such as the Coastal crude oils, California type crudes and particularly from naphthenic base crude petroleum. Such naphthenic fractions boiling in the range of 150 to 500° F. may also be obtained from catalytic conversion operations such as catalytic operations and may be employed either alone or in admixture with crude oil fractions as the feed stock for a reforming operation.

In the reforming of hydrocarbon feed stocks it is preferred to pass vaporized feed stock through the reaction zone at a liquid space velocity in the range from about 1 to about 4 liquid volumes of feed per volume of catalyst per hour. A space velocity of 2 v./v./hr. gives very desirable results when charging a Coastal crude fraction.

The reactor inlet temperature may be within the range of 850 to 1000° F. with a preferred temperature of about 925° F. The reforming reaction being endothermic, and commercial reactors ordinarily operating adiabatically, the reactor outlet temperature will ordinarily be between 700° and 950° F.

The pressure employed in the reaction zone may be within the range of 50 to 700 pounds per square inch with a preferred range of about 200 to about 400 pounds per square inch.

The amount of hydrogen employed for the reaction may range from about 1000 cubic feet to about 10,000 cubic feet per barrel of feed. Preferably about 5000 cubic feet of hydrogen per barrel of feed may be used.

The catalyst employed in the practice of the present invention preferably will be a platinum on alumina catalyst containing from about 0.1% to 3.0% by weight of platinum, preferably 0.2% to 1.0% by weight. It is desirable that the alumina on which the platinum is deposited be a purified alumina, such as a gamma alumina derived from boehmite. Although gamma alumina or purified alumina is preferred, we may use a platinum on alumina derived from other sources. There are numerous aluminas on the market which are available as supports for catalysts and we intend that we may use a platinum on alumina catalyst of the type available. We also intend that other supported platinum catalysts may be used such as platinum on zirconia, magnesia, and magnesia-alumina mixtures, and the like.

Figure 2:
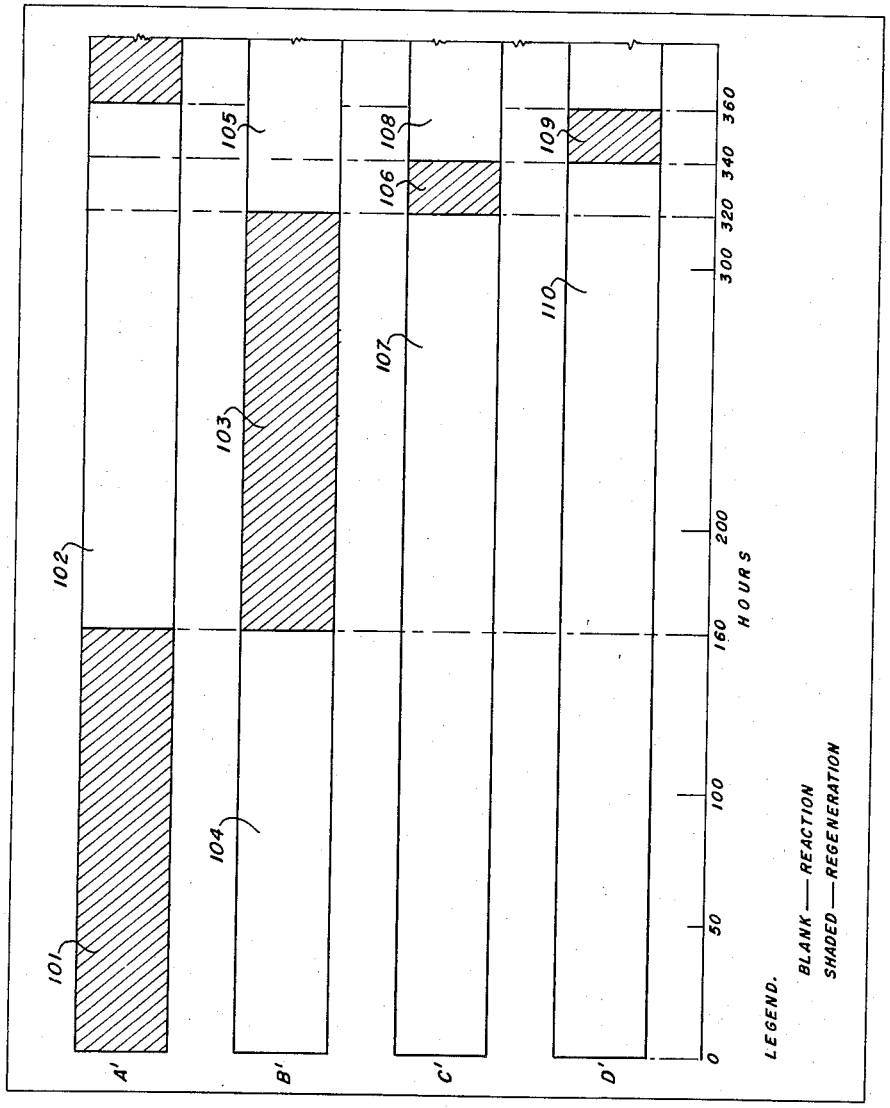

A method for practicing the present invention will now be described in detail in conjunction with the drawing in which Fig. 1 is in the form of a diagrammatic flow sheet; and, Fig. 2 is in the form of a cycle sheet illustrating the cycles of the four catalytic reaction units shown in Fig. 1.

Turning now specifically to the drawing and first to Fig. 1, the principal units are a pair of head reaction zone units A and B, additional reaction zone units C and D, heating units E, F, G, and H, waste heat boiler J, gas separator K and compressor L. The upper ends of reactors A, B, C and D are provided with connecting lines 11, 12, 13, and 14, respectively. The lower ends of units A, B, C and D are provided with connecting lines 15, 16, 17 and 18, respectively. Manifold M is connected to the upper ends of reactors A and B through connecting lines 11 and 12. Manifold N is connected to reactors C and D through connecting lines 13 and 14. Manifold O is connected to reactors A, B, C and D through connecting lines 11, 12, 13 and 14, respectively, and manifold P is connected to reactors A, B, C and D through connecting lines 11, 12, 13 and 14, respectively. In addition, manifold Q is connected to the upper ends of reactors A, B, C and D through separate connecting lines 21, 22, 23 and 24, respectively. Flow through connecting lines 21, 22, 23 and 24 is controlled respectively by valves 21', 22', 23' and 24'.

Manifold R is connected to the lower ends of reactors A and B through lines 15 and 16, respectively. Manifold S is connected to the lower ends of reactors A, B, C and D through connecting lines 15, 16, 17 and 18, respectively. Manifold T is connected to the lower ends of reactors C and D through connecting lines 17 and 18, respectively. Manifold U is connected to the lower ends of reactors A, B, C and D through connecting lines 15, 16, 17 and 18, respectively.

Manifold U is connected to the lower ends of reactors A, B, C and D through branch lines 25, 26, 27 and 28, respectively. The flow through branch lines 25, 26, 27 and 28 is controlled by valves 25', 26', 27' and 28', respectively.

Typical charge stock is introduced into the system through inlet line 30, passes through heater G and thence through line 31 to manifold M. Manifold M is connected through branch line 32, controlled by valve 32' to inlet line 11 of reactor A and through line 33, controlled by valve 33' to inlet line 12 of reactor B. Manifold R is connected through line 15 to the lower end of reactor A by way of branch line 34, controlled by valve 34' and to the lower end of reactor B by line 16 by way of branch line 35, controlled by valve 35'.

Manifold R is connected through line 36 to the inlet of first reheat furnace E. Reheat furnace E discharges through outlet line 37 to manifold O. Manifold O is connected to the tops of reactors A, B, C and D through the respective connecting lines 11, 12, 13 and 14 of these reactors by way of branch lines 41, 42, 43 and 44, respectively. The flow through branch lines 41, 42, 43 and 44 is controlled by valves 41', 42', 43' and 44'.

Manifold S is connected to the lower ends of reactors A, B, C and D through lines 15, 16, 17 and 18, respectively, by means of branch lines 45, 46, 47 and 48, respectively. Flow through branch lines 45, 46, 47 and 48 is controlled by valves 45', 46', 47' and 48', respectively. Manifold S is connected through line 49 to second reheat furnace F. The outlet of second reheat furnace F is connected through line 50 to manifold N. Manifold N is connected to inlet line 13 at the upper end of reactor C by way of branch line 51, controlled by valve 51' and to inlet line 14 at the upper end of reactor D by way of line 52, controlled by valve 52'.

Manifold T is connected to outlet line 17 at the lower end of reactor C through branch line 53, controlled by valve 53' and to outlet line 18 at the lower end of reactor D through branch line 54, controlled by valve 54'. Manifold T is connected through line 55 to gas separator K.

In separator K liquid and gaseous components are separated, the liquid component being withdrawn through outlet line 60 as product and the gas being withdrawn through line 61. Excess gas may be removed through line 62 controlled by valve 63 while the remainder flows through line 61 to recycle gas heater H and then discharges through line 64. From line 64 the recycle gas may pass either through line 65 into the naphtha containing charge line 31 for admixture therewith or alternatively through line 66 which discharges into manifold P. Manifold P is connected to the inlet line 11 of reactor A, inlet line 12 of reactor B, inlet line 13 of reactor C and inlet line 14 of reactor D by way of branch lines 67, 68, 69 and 70. The flow through branch lines 67, 68, 69 and 70 is controlled by valves 67', 68', 69' and 70', respectively.

Manifold V is provided for removing recycle gas from the reactor vessels and is connected through outlet line 15 of reactor A, through outlet line 16 of reactor B, through outlet line 17 of reactor C and through outlet line 18 of reactor D by way of branch lines 71, 72, 73 and 74, respectively. Flow through branch lines 71, 72, 73 and 74 is controlled by valves 71', 72', 73' and 74', respectively. Manifold V is connected through line 75 to recycle gas line 61.

Air may be introduced into the system from a source not shown through inlet line 80 compressed by compressor 81 and discharged to line 82 which connects through line 83 to manifold U. Flue gas from waste heat boiler J passes through line 84, compressor L and line 86 into line 83. Thus either air separately, flue gas separately or mixtures of flue gas and air in the desired proportions may flow through line 83 to manifold U. When flue gas or air or mixtures thereof are passed to one or more of reactors A, B, C and D, the effluent may be removed through manifold Q, connected by branch lines 21, 22, 23 and 24 to reactors A, B, C, and D, respectively, and may pass from manifold Q through line 87 to waste heat boiler J. Excess flue gas may be withdrawn from waste heat boiler J through outlet line 88. As indicated in the drawing, feed water is introduced into boiler J through inlet line 89 and steam is removed through line 90.

To start the description it will be assumed that the bed of platinum catalyst in reactor A has become partly deactivated by the deposition of carbonaceous material thereon so it should be regenerated and the charge mixture is to be passed in series through reaction zones B, C, and D. A naphthenic charge stock boiling in the range from about 150° to about 500° F. is introduced through charge line 30, passes through heater G and through outlet line 31 where it is admixed with hydrogen containing gas from line 65. The mixture of vaporized hydrocarbon and hydrogen in line 31 passes by way of manifold M, branch line 33 with valve 33' open, into inlet line 12 and into head reactor B. The products of the reaction in zone B are withdrawn through outlet line 16, branch line 35, through open valve 35', manifold R and line 36 to furnace E and are there reheated and then discharged to line 37. From line 37 the stream passes by manifold O, branch line 43 and open valve 43' to line 13 and into reactor C.

The products from reactor C pass through outlet line 17, branch line 47, open valve 47', manifold S, line 49 and thence through furnace F to line 50, manifold N and to branch line 52 and open valve 52' to inlet line 14 and into reactor D. From reactor D the products are withdrawn through line 18, branch line 54, open valve 54', manifold T and line 55 which discharges into gas separator K. From gas separator K gas is withdrawn for recycling through line 61 with excess gas being withdrawn through outlet line 62 controlled by valve 63. Liquid product is withdrawn from gas separator K through outlet line 60.

While the hydrocarbon feed stock is being reacted in the reaction zones B, C, and D, the catalyst in reactor A is regenerated by introducing an oxygen containing gas such as air through line 80, compressor 81, line 82, the air being mixed with flue gas from line 86 and the mixture passing through line 83 to manifold U and thence through branch line 25 and open valve 25' to reaction zone A. When regenerating the platinum catalyst, it is preferred that the catalyst temperature in the flame front passing through the catalyst bed be no greater than 1100° F. with this temperature controlled by the amount of free oxygen introduced into the reaction zone in admixture with the flue gas. For a more complete description of the procedure for regenerating platinum catalyst see copending application Serial No. 343,198, filed in the name of Robert M. Love on March 18, 1953, entitled "Treatment of Platinum Catalyst."

The products of combustion in zone A are withdrawn through outlet line 21 having open valve 21' and passed to waste heat boiler J where the excess heat is employed to produce steam. Excess flue gas is withdrawn through outlet line 88 and the necessary flue gas for regeneration is withdrawn through line 84 where it passes to compressor L.

After the platinum catalyst in reaction zone A has been regenerated, there will be a considerable time interval during which zone A is kept off stream, while reaction proceeds in zones B, C, and D. During this time heated gas, inert to the platinum catalyst, may be passed through zone A. This may be flue gas, oxygen containing flue gas, air, or hydrogen rich recycle gas.

After the platinum catalyst in reaction zone A has been regenerated, it may be put back in service and reaction bed B regenerated while simultaneously the reaction mixture passes first through head reactor A and then through the remaining reactors C and D. After reactor zone B has been regenerated reaction zones C and D may be separately regenerated while passing the feed mixture in series through either A or B as the first reactor, then through the remaining reactors except the one being regenerated. By way of illustration, the cycle of flow may be as follows: through B, C, and D; through A, C, and D; through A, B, and D; through A, B, and C.

According to the present invention, head reactors A and B will be alternately off stream, whereas each of the remaining reactors is onstream at all times except when it is being regenerated. The time required to regenerate any reactor in the system is relatively short compared to the total cycle length. The total regeneration cycle will require in the range from 10 to 30 hours, whereas a total cycle of the whole system may be from 200 to 800 hours. Hence, each of the head reactors A and B is required to be off stream for a much greater length of time than is required to regenerate it. It is preferred to regenerate each head reactor immediately after it is taken off stream, and, after the regeneration has been completed, to continuously circulate through the reactor a heated gas which is inert to the catalyst. This may be either flue gas, or it may be oxygen containing flue gas, or it may be recycle gas.

The reaction and regeneration cycles of the hydroforming reactors A, B, C, and D are shown in Fig. 2, cycles A', B', C', and D' corresponding to units A, B, C, and D of Fig. 1, respectively.

In the chart designated A', 101 designates the time unit A is off stream, including the time during which it is being regenerated and 102 the time it is used for conducting a naphtha reforming reaction.

In the chart designated B', 103 designates the time unit B is off stream, including the time during which it is being regenerated and 104 and 105 the times it is being used for conducting a naphtha reforming reaction.

In the chart designated C', 106 designates the time unit C is being regenerated and 107 and 108 the times it is used for conducting a naphtha reforming reaction.

In the chart designated D', 109 designates the time unit D is being regenerated and 110 the time it is being used for conducting a naphtha reforming reaction.

The time scale in Fig. 2 shows a total time for the cycle of 360 hours. It is to be understood that this by way of illustration only and that in practice good results may be secured by the use of a time cycle within the range of 200 hours to 800 hours. However, as seen in Fig. 2, for a complete cycle, reactor A is off stream, including the time during which it is being regenerated 160 hours out of the total cycle of 360 hours, reactor B is off stream, including the time during which it is being regenerated 160 hours out of a total of 360 hours while reactors C and D are each off stream being regenerated a total of 20 hours out of the cycle time of 360 hours. Thus, for each cycle of 360 hours for the system each of the reaction zones is regenerated a single time.

It is to be understood that the procedure described involving combustion at a controlled rate is to be distinguished from a catalyst reactivation procedure, such as is described, for example, in said Serial No. 343,198 of Robert M. Love.

In such a reactivation procedure, the regenerated catalyst may, for example, be exposed at an elevated temperature to an atmosphere containing a relatively high partial pressure of oxygen. Other methods of reactivating platinum catalyst may be employed.

In regenerative reforming employing platinum catalyst, it has been found that after a number of regenerations by controlled combustion the catalyst no longer is returned to sufficient activity after regeneration. Reactivation of such deactivated catalyst is then in order. It has been found that carbon deposition in a lead reactor of a system such as herein described takes place at approximately twice the rate prevailing in the remaining reactors. According to the present invention therefore, two lead reactors are provided, of which each is onstream during half the total cycle, so that each reactor in the system requires regeneration only once during each complete cycle. This permits catalyst deactivation to take place at a uniform rate in all reactors. The catalyst reactivation procedure is therefore required for the catalyst bed in each reactor at the same time. Since relatively high oxygen pressure prevails in the reactor chamber during the reactivation step, it may be necessary to remove hydrocarbons from the reactors, connecting lines, and associated equipment prior to reactivation. It is thus seen to be a substantial advantage to have all reactors on reactivation at one and the same time.

Furthermore, after the platinum catalyst has been reactivated several times, it usually loses activity to such an extent that reactivation no longer is sufficient to restore its activity to a commercially useful level. At such time, the total catalyst mass must be removed and replaced by fresh or reworked catalyst. It is thus a further advantage of the present invention that all the catalyst in the system reaches the stage at which it requires replacement at the same time, thus facilitating the catalyst replacement.

A further considerable advantage of the present invention is that it permits timing of the total reaction cycle by an automatic cycle timing instrument, operating controlled valves in a known manner. If each reactor were to be operated in any position in the system, catalyst deactivation would take place at different rates at different times, and automatic control could not be provided.

While specific examples for the practice of the present invention have been given, it is to be understood that these are for illustrative purposes only and not by way of limitation.

The present invention having been fully described and illustrated, what is claimed is:

1. In a reforming system in which a plurality of independent reaction zones greater than two each containing a platinum catalyst are contacted with a feed mixture consisting of hydrocarbon and hydrogen introduced at a temperature within the range of 850 to 1000° F. to reform the hydrocarbon in which reaction the platinum catalyst in said reaction zones becomes at least partially deactivated by deposits of carbonaceous materials thereon during a reaction cycle within the range from 200 to 800 hours for the system, the improvement which comprises the steps of selecting two of said reaction zones as a first head reaction zone and a second head reaction zone, keeping the first head reaction zone off stream for approximately an initial one-half time of said complete cycle for the system and regenerating it while it is off stream while simultaneously passing feed stock mixture first through the second head reaction zone and then in series through the remaining reaction zones and continuing the flow of said feed mixture through said series of reaction zones for approximately said initial one-half time for a complete cycle for the system, subsequently removing the second head reaction zone from contact with the feed mixture and keeping it off stream for approximately the terminal one-half the time of said complete cycle for the system and regenerating it while it is off stream, the total regeneration time for said first and second head reaction zones being within the range from 10 to 30 hours with heated oxygen-containing gas inert to the catalyst being circulated through said first and second head reaction zones during the period after the catalyst in said first and second head reaction zones has been regenerated and prior to placing said first and second head reactions back on stream, and simultaneously passing feed mixture through the first head reaction zone and then in series through the remaining reaction zones, subsequently separately removing each of the remaining reaction zones from contact with feed mixture, keeping each off stream for only a small part of the complete cycle of the system and regenerating while off stream by passing the feed stock through one of said head reaction zones and then in series through the remaining reaction zones except the one off stream and subsequently repeating the complete cycle, substantially identical reaction conditions being employed in each of said reaction zones and said feed mixture always passing through one of said head reaction zones before passing through the remaining reaction zones.

2. In a reforming process wherein a platinum catalyst contained in each of four independent reaction zones is contacted with a feed mixture consisting of naphthenic hydrocarbon boiling in the range from about 150° to 500° F. and 1000 to about 10,000 cubic feet of hydrogen per barrel of naphthenic hydrocarbon at a temperature within the range of 850° to 1000° F., a pressure within the range of 50 to 700 pounds per square inch at a liquid space velocity in the range of from about 1 to 4 liquid volumes of feed per volume of catalyst per hour to reform said hydrocarbon, whereby the platinum catalyst in said reaction zones becomes at least partially deactivated by the deposit of carbonaceous materials thereon during a reaction-regeneration cycle within the range from 200 to 800 hours for the system, the improvement which comprises the steps of selecting two of said reaction zones as first and second head reaction zones and the remaining reaction zones as third and fourth additional reaction zones, keeping said first head reaction zone offstream for approximately an initial one-half time of said cycle, less the time required for regenerating one of said third and fourth regeneration zones, regenerating said first head reaction zone during the first part of said initial approximately one-half time and passing a heated oxygen-containing gas inert to the platinum catalyst through said first head reaction zone during the remainder of said initial approximately one-half time, simultaneously passing said reaction mixture through said second head reaction zone and then in series through said third and fourth reaction zones under said reaction conditions during said initial approximately one-half time, then removing said second head reaction zone from contact with said feed mixture and keeping it offstream for approximately the terminal one-half time of said cycle, less the time required for regenerating one of said third and fourth reaction zones, regenerating said second head reactor during the first part of said terminal approximately one-half time and passing a heated oxygen-containing gas inert to said platinum catalyst therethrough during the remaining portion of said terminal approximately one-half time, the total regeneration time for said first and second head reaction zones being within the range from 10 to 30 hours, simultaneously passing said feed mixture during said terminal approximately one-half time through said first head reaction zone and then in series through said third and fourth reaction zones under said reaction conditions, next removing said third reaction zone from contact with said feed mixture for a period of time sufficient to regenerate the same and regenerating said third reaction zone while passing said feed mixture through said first and second head reaction zones and then through said fourth reaction zone under said reaction conditions, completing said reaction-regeneration cycle by removing said fourth reaction zone from contact with said feed mixture for a period of time sufficient to regenerate the same and regenerating said fourth reaction zone while passing said feed mixture through said first and second head reaction zones and then through said third reaction zone under said reaction conditions, and subsequently repeating the cycle of operations, substantially identical reaction conditions being employed in each of said reaction zones and said feed mixture always passing through at least one of said head reaction zones before passing through the other of said reaction zones.

References Cited in the file of this patent
UNITED STATES PATENTS

| | | |
|---|---|---|
| 2,273,299 | Szayna | Feb. 17, 1942 |
| 2,303,076 | Frolich | Nov. 24, 1942 |
| 2,498,559 | Layng et al. | Feb. 21, 1950 |
| 2,547,221 | Layng | Apr. 3, 1951 |
| 2,578,704 | Houdry | Dec. 18, 1951 |
| 2,654,694 | Berger et al. | Oct. 6, 1953 |
| 2,664,386 | Haensel | Dec. 29, 1953 |